A. ROBINSON.
Apparatus for Steaming Leaf-Tobacco.

No. 216,293. Patented June 10, 1879.

Attest:
S. S. Schoff
Chas. H. Schoff

INVENTOR:
Abraham Robinson
By F. F. Warner, his
Attorney.

UNITED STATES PATENT OFFICE.

ABRAHAM ROBINSON, OF CHICAGO, ILLINOIS.

IMPROVEMENT IN APPARATUS FOR STEAMING LEAF-TOBACCO.

Specification forming part of Letters Patent No. 216,293, dated June 10, 1879; application filed February 28, 1879.

*To all whom it may concern:*

Be it known that I, ABRAHAM ROBINSON, of Chicago, in the county of Cook and State of Illinois, have invented certain new and useful Improvements in Apparatus for Steaming Leaf-Tobacco, of which the following, in connection with the accompanying drawings, forming a part thereof, is a full, clear, and exact description, which will enable others skilled in the art to which my invention appertains to apply my improvements to use.

Figure 1:
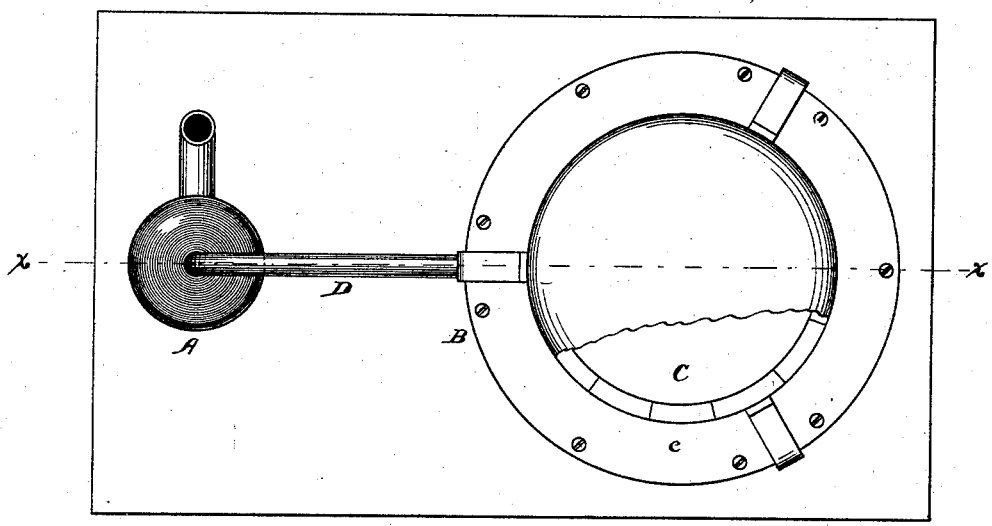
Figure 2:
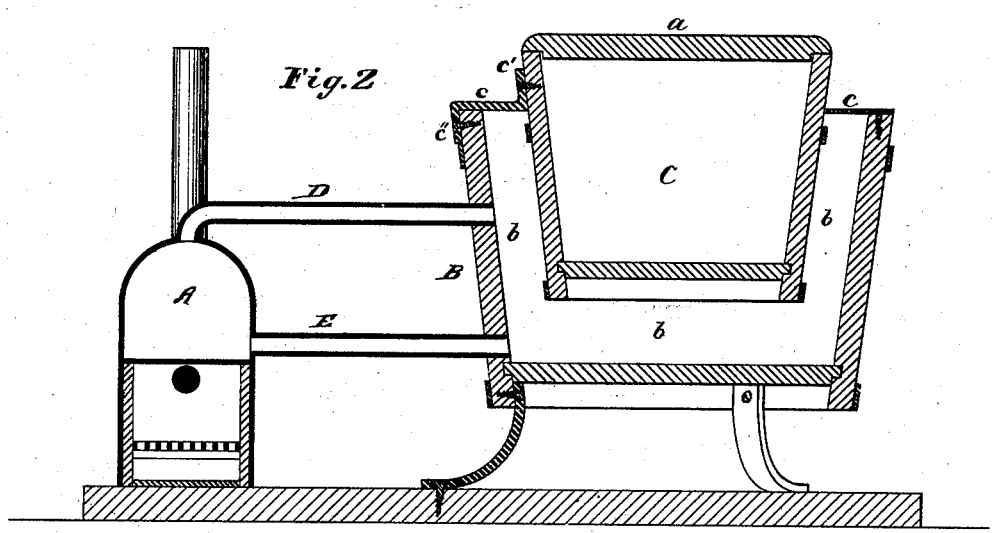

Figure 1 is a top or plan view of an apparatus embodying my improvements, and Fig. 2 is a vertical central section of the steam-receiver and tobacco-holder.

Like letters of reference indicate like parts.

It is usual to soften the leaves of tobacco, as is well known, in order to prepare them for being manufactured into cigars and other manufactured goods and to bring out a good and uniform color. This has been done heretofore in various ways, and, among others, by dampening the leaves and exposing them to heat while in that condition.

The object of this invention is to provide improved means for exposing the leaves to the action of steam for the purposes above set forth; and to that end my invention consists of a tobacco-holding vessel made of wood sufficiently porous to permit the steam to percolate through it, in combination, substantially as hereinafter described, with a steam-generating apparatus and a steam-receiving chamber surrounding the vessel for containing the tobacco.

I am aware that the general structural plan of the apparatus hereinafter described is old, and I do not, therefore, here intend to claim the same independently of a tobacco-receiving vessel made of wood sufficiently porous to permit the steam to percolate through it, as and for the purposes set forth, the said wooden vessel constituting, as I believe, an improvement upon the apparatus heretofore in use, for the reason that, in employing wood instead of metal in the construction of the said vessel, the tobacco is prevented from being tainted, and may be kept continually moist by the action of the steam, instead of being merely heated and sweated by it, or steamed only by the generation of steam in the same vessel containing the tobacco, it being obvious that, if the tobacco-receiving vessel be made of metal, as heretofore in devices of this class, the steam in an outer surrounding vessel would merely heat the tobacco and sweat it without imparting new moisture to it. Neither do I here intend to claim the process, as such, of steaming tobacco.

In the drawings, A represents an ordinary boiler for generating steam. B is a tank or vessel for receiving the steam generated by the boiler A. C is a tight wooden vessel for receiving the tobacco to be treated. This vessel should be provided with a tight-fitting cover, $a$. I make the vessel C of wood, as an essential feature of my invention, in order that the steam may sweat or percolate through it from the tank B, and so that the tobacco will not be tainted by contact with metal. The vessel C is enough smaller than the tank B to be suspended in the latter and leave an annular space, $b$, between the two, as well as a space underneath the bottom of the vessel C, as shown. The space $b$ should also be covered. In order to provide a cover for the space $b$, and also suspend the vessel C firmly in the tank B, I employ an annular rim or lid, $c$, having an upwardly-turned flange, $c'$, fitted to the vessel C, and a downwardly-turned flange, $c''$, fitted to the tank B, screws or other fastenings passing through the flanges into the parts to which they are fitted; but it is not essential that these flanges should be continuous or extend entirely around the vessels. Neither is it essential that the flanged portions of the lid $c$ should be continuous, or in the same piece with the remaining part of the said lid. It is, in fact, much the easier way to make the flanged portions separately from the lid proper, and I have represented them as made in that manner.

I do not, however, here intend to be restricted to any particular way of applying the lid $c$ and suspending the vessel C, as both may be done in various suitable ways; but I deem the manner shown to be the best.

D is a steam-pipe leading from the upper part of the boiler A into the upper part of the space $b$, and E is a water-pipe leading from the lower part of the said space into the lower part of the boiler.

To use this apparatus for the purpose for which it is intended, the water in the boiler should be heated until steam is generated. The tobacco to be treated should be placed in the vessel C and covered, the tobacco being then in the condition in which it exists when taken from the cases or packages in which it may have been packed by the producers or shippers.

The water as well as the steam will enter the space $b$ and produce a sufficient temperature in the vessel C to sweat the tobacco therein, the steam producing moisture in the vessel C by sweating or percolating through it from the space $b$ in addition to the moisture originally in the tobacco before it was confined in the vessel. The steam which enters the space $b$ through the pipe D, finding a lower temperature in the said space than in the boiler, becomes condensed, and is added or returned to the volume of water which flows from the said space into the boiler, and thus keeps the latter supplied. A circulation of water and steam is also kept up to a certain extent.

In a building where steam is supplied through pipes, the steam may be conducted into the space $b$ from the boiler which supplies the steam wherever the boiler may be situated. The tobacco should be exposed to this treatment from three to eight days, according to the result desired to be produced, and it will thus be rendered soft and pliable, and of a uniform and dark color, without being in any way injured. The tobacco prepared in this manner may be manufactured into various articles, like cigars and cigarettes.

I deem it preferable to make the tank B as well as the tank C of wood, so as to prevent tainting the tobacco, and so as to render the apparatus capable of treating large quantities of tobacco at the same time, and without making the apparatus heavy and expensive, and to employ a boiler wholly detached from the tank B, excepting by the steam and water pipes connecting the same, thus enabling me to make the outer or larger tank of wood without exposing it to danger from fire. A detached boiler amply sufficient to be employed in connection with very large tanks will be comparatively simple and cheap.

Having thus described my invention, what I claim as new, and desire to secure by Letters Patent, is—

1. The apparatus, substantially as described, for treating tobacco, to wit: the tight vessel or tank B, the tight vessel C, made of wood and suspended in the tank B, and a steam generator or heater, all combined and operating together, substantially as and for the purposes specified.

2. The combination of the boiler A, the tight tank B, made of wood, the tight vessel C, made of wood and suspended in the tank B, and the pipes D and E entering the tank B and the boiler, all arranged and operating substantially as and for the purposes specified.

ABRAHAM ROBINSON.

Witnesses:
F. F. WARNER,
H. C. BALLARD.